United States Patent

[11] 3,587,653

| [72] | Inventors | Alphonse A. Jacobellis;<br>Abduz Zahid, Los Angeles, Calif. |
|---|---|---|
| [21] | Appl. No. | 797,390 |
| [22] | Filed | Feb. 7, 1969 |
| [45] | Patented | June 28, 1971 |
| [73] | Assignee | Greer Hydraulics, Inc.<br>Los Angeles, Calif. |

[54] SPHERICAL ACCUMULATOR
10 Claims, 2 Drawing Figs.

[52] U.S. Cl. ................................................ 138/30
[51] Int. Cl. ................................................ F16l 55/04
[50] Field of Search .......................................... 138/30;
239/89, 96

[56] References Cited
UNITED STATES PATENTS

| 2,283,439 | 5/1942 | Herman | 138/30 |
| 2,300,722 | 11/1942 | Adams et al. | 138/30 |
| 2,343,320 | 3/1944 | Parker | 138/30 |
| 2,345,124 | 3/1944 | Huber | 138/30 |
| 2,394,401 | 2/1946 | Onerbeke | 138/30 |
| 2,489,491 | 11/1949 | Johnson | 138/30 |
| 2,773,511 | 12/1956 | Mercier | 138/30 |
| 3,003,522 | 10/1961 | Rohacs | 138/30 |
| 3,088,492 | 5/1963 | Mercier | 138/30 |
| 3,428,091 | 2/1969 | Sugimura et al. | 138/30 |

Primary Examiner—Herbert F. Ross
Attorney—Arthur B. Colvin

ABSTRACT: This invention relates to a pressure vessel having two juxtaposed hemispherical shells, each with a peripheral flange between which the periphery of a deformable separator in the form of a bladder is secured to define a chamber on each side thereof in communication respectively with an axial port in the associated shell, the bladder having a hemispherical configuration complementary to that of one of said shells and carrying a metal button axially aligned with the shells and adapted alternately to seat on said ports to close the latter without stretching of the bladder.

PATENTED JUN28 1971  3,587,653

INVENTORS
ALPHONSE A. JACOBELLIS
ABDUZ ZAHID
BY
ATTORNEY

SPHERICAL ACCUMULATOR

It is among the objects of the invention to provide a pressure vessel of the type having two juxtaposed hemispherical shells with a deformable partition intevening between two opposed axial ports in said shells and defining a chamber on each side thereof, which partition has its periphery dependably retained in sealed position with assurance that the chambers will be completely isolated and without likelihood of injury to the partition by reason of the retention thereof, which partition will have substantially no stretch imparted thereto during use of the pressure vessel thereby enhancing the life thereof and which pressure vessel may readily be fabricated at relatively low cost.

According to the invention these objects are accomplished by the arrangement and combination of elements hereinafter described and more particularly described in the claims.

Figure 1:
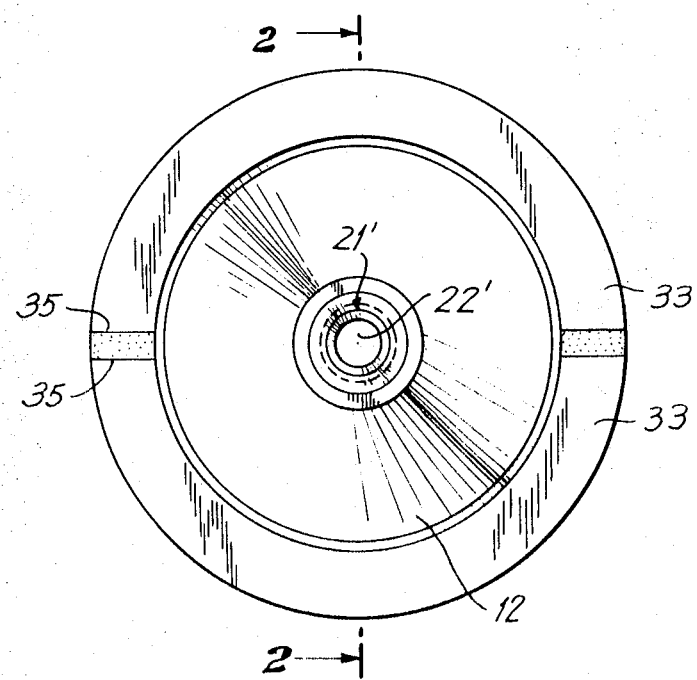
Figure 2:
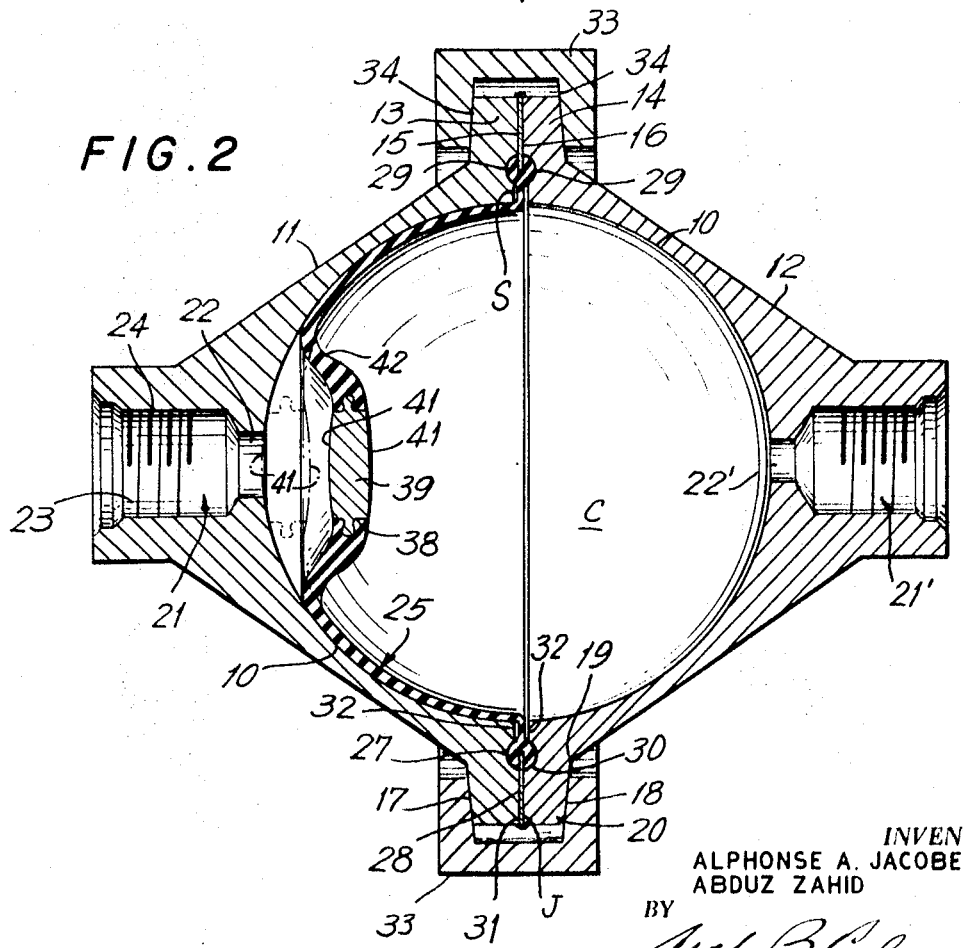

In the accompanying drawings in which is shown one of various possible embodiments of the several features of the invention, FIG. 1 is an end view of a pressure vessel according to the invention, and FIG. 2 is a sectional view taken along line 2-2 of FIG. 1.

Referring now to the drawings, the pressure vessel, illustratively a pressure accumulator, desirably comprises a pair of substantially cup-shaped shells 11 and 12 of any suitable rigid material capable of withstanding relatively high pressures. Each of the shells 11 and 12, which are illustratively identical in configuration, has an hemispherical concavity 10 so that when the two shells are juxtaposed, the interior thereof will form a spherical concavity.

More particularly, each of the shells has a peripheral annular flange 13, 14, the adjacent surfaces 15, 16 thereof abutting when the shells are juxtaposed as shown in FIG. 2. The outer surfaces 17, 18 of each of the flanges 13, 14 are bevelled as shown, so that the thickness of each of the annular flanges is greater at its root end 19 than at its free end 20 for the purpose hereinafter to be described.

Each of the shells has an axial bore 21, 21' therethrough which is of relatively small diameter at its inner end as at 22, 22' to define a port and of enlarged diameter at its outer end as at 23, said outer end being internally threaded as at 24 to receive a suitable fitting. The bore 21, for example, is designed to be connected to a source of fluid such as oil under pressure and the bore 21' is designed to be connected to a source of gas under pressure.

Interposed between the ports 22, 22' is a flexible and deformable partition 25 of resilient material, preferably a suitable plastic such as fluorosilicon. More particularly, the partition has a thickened peripheral rim in the form of an annular bead 27 in which is molded the inner periphery of an annulus such as a metal ring 28, said annulus extending radially outward from said bead 27.

Means are provided securely to mount said partition 25 between said shells 11 and 12. To this end each of the flanges 13, 14 in its inner surface 15, 16 adjacent its inner periphery has an arcuate groove 29 which, when juxtaposed, as shown in FIG. 2, define an annular cavity 30 substantially cylindrical in cross section in which the bead 27 may be accommodated. The cylindrical annular cavity is of cross section slightly less than that of the bead 27 so that when the flanges are moved together in the manner hereinafter to be described, the bead 27 will be compressed to define a seal.

The metal ring 28 is of width such that when the bead 27 is positioned in the cylindrical annular cavity 30 the ring 28 will extend radially outward, with the outer periphery 31 thereof substantially aligned with the outer ends 20 of the juxtaposed flanges.

To retain the shells 11, 12 in juxtaposition, they are moved together by a clamp of any suitable type and the annular junction J between the outer periphery of the two flanges in which the outer periphery 31 of the metal ring 28 is exposed is welded, to retain such outer periphery in fixed position and to provide a seal.

In order to accommodate the wall of the partition 25 adjacent the bead 27 to prevent cutting thereof when the flanges are juxtaposed, each of the flanges 13, 14 has an annular groove 32 in its inner surface 15, 16 positioned inwardly of the annular groove 29, such annular grooves 32 when juxtaposed providing an annular space S to accommodate the wall of the partition without cutting thereof.

Thereupon, to insure retention of the juxtaposed shells 11, 12, a pair of arcuate clamping segments 33 are provided, each occupying slightly less than 180° of arc. Each of the clamping segments 33 in cross section is substantially U-shaped, the opposed surfaces 34 of each of the legs of each segment having an incline substantially equal to the incline of the outer portions 17, 18 of flanges 13 and 14.

The clamping segments are positioned so that the legs thereof straddle the flanges 13 and 14 and the segments are then forced radially inwardly by any suitable means. As a result, the inclined portions of their legs will cam the flanges 13, 14 toward each other insuring that the flanges remain in juxtaposition. Thereupon the adjacent edges 35 of the segments 33 are secured as by welding as shown in FIG. 1.

As is shown in FIG. 2, the partition 25 is in the form of a cup-shaped bladder and is also substantially hemispherical corresponding to the hemispherical concavity in each shell.

The bladder 25 has an axial opening 38 in which is secured as by molding, a metal disc or button 39, the latter serving as a closure valve and having opposed convex surfaces 41 of curvature corresponding to the curvature of the portion of each shell encompassing the ports 22, 22', the disc 30 being adapted to seat on the inner periphery of each of the shells in alignment with the associated port 22 and 22' to close the latter in the manner hereinafter to be described.

As shown in FIG. 2, in forming the bladder, it is molded so that the portion 42 thereof adjacent the axial opening 38 is reversely curved for the purpose hereinafter set forth.

In the operation of the accumulator a source of gas under pressure is applied to the outer end of port 21' and the chamber C is charged with such gas under pressure. As a result, the partition will move to the left as shown in FIG. 2 snugly engaging the curved wall of the shell 11 and the valve member 39 will seat against the wall of said shell 11 around the periphery of port 22 as shown in broken lines to seal the latter. Thereupon, a fluid such as oil under pressure greater than that in the chamber C may be applied to the port 22 causing the valve member 39 to move off its seat and thereupon moving the bladder to the right. Due to the configuration of the bladder, the valve member 39 will seat against the wall of shell 12 around the periphery of the gas port 22' before the bladder can move against such port, thereby preventing extrusion of such bladder with resultant injury thereto.

When the port 22 is opened for discharge of oil from the unit, by reason of the configuration of the bladder it will follow the wall surface of shell 11 forcing substantially all of the oil contained therein through the port 22. By reason of the fact that the bladder 25 is molded with the portion 42 adjacent the opening 38 therein curved inwardly, such portion and hence the valve member 39 carried in such opening will not finally move to close the port 22 until substantially all of the oil has been discharged, thereby providing a high degree of efficiency.

It is to be noted that with the construction above-described, the periphery of the bladder will be retained between the annular flanges 13 and 14, not only by reason of the squeezing action of the walls of the annular cavity 30 against the annular bead 27, but also by the fact that the annular member 28 bonded to the annular bead is welded as at 31 to the outer periphery of the junction J between the annular flanges 13, 14.

It is further to be noted that there is a dependable seal provided by such construction, not only between the chambers on each side of the bladder, but also between such chambers and the exterior.

By reason of the shape of the bladder above-described, there is substantially uniform movement of the bladder from one side of the unit to the other without stretching of the bladder and with assurance that the gas and oil ports will be closed without likelihood of extrusion of the bladder.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

We claim:

1. A pressure vessel comprising a pair of shells each having a substantially hemispherical cavity therein, each of said shells having a peripheral flange extending radially outwardly with respect to the axis of the cavity, means to retain said flanges in juxtaposition to define a substantially spherical cavity, said shells each having an axial port, a deformable partition positioned in said spherical cavity intervening between said ports and defining a chamber on each side thereof, the periphery of said partition being clamped between said flanges, said partition comprising a bladder having a hemispherical configuration complementary to that of one of said shells, said bladder being adapted to move axially and unstretched against the portion of the inner surface of each of said shells encompassing the associated port to seal such port, 2. The combination set forth in claim 1 in which said partition has an axial opening, a valve member substantially in the form of a disc is secured in said opening and is adapted to move against the portion of the inner surface of each of the shells encompassing the associated port to seal such port.

3. The combination set forth in claim 2 in which opposed surfaces of said disc are convex conforming to the curvature of the portion of each of said shells encompassing the periphery of an associated port.

4. The combination set forth in claim 2 in which one of said ports defines an oil port and the other of said ports defines a gas port, said partition in its normal unstressed condition having the portion thereof adjacent the periphery of the valve member reversely bent whereby said valve member will normally be spaced from said oil port when the remaining wall portion of said partition is engaging the wall surface of the associated shell.

5. The combination set forth in claim 1 in which said partition has an annular bead, said annulus of rigid material is a metal ring having its inner periphery molded in said bead with said annulus extending radially outward therefrom, said juxtaposed flanges adjacent their inner periphery having aligned annular grooves to accommodate said annular bead, said annulus extending outwardly from said annular grooves between such juxtaposed flanges.

6. The combination set forth in claim 5 in which the surfaces of said juxtaposed flanges inwardly of said annular grooves are spaced to define clearance for the wall portion of said partition inwardly of said annular bead.

7. The combination set forth in claim 5 in which arcuate clamping members are provided substantially U-shaped in cross section encompassing said juxtaposed flanges securely to retain the latter together.

8. The combination set forth in claim 7 in which adjacent ends of said arcuate segments are bonded together.

9. The combination set forth in claim 7 in which the outer surfaces of said juxtaposed flanges are beveled so that the thickness of the juxtaposed flanges decreases from the root ends thereof to the outer peripheries thereof and said clamping members have a complementary configuration whereby when said clamping members are moved radially inwardly on said flanges the latter will be forced together.

10. The combination set forth in claim 1 in which the outer periphery of said annulus is bonded to the outer peripheries of said flanges.